Oct. 11, 1932.  G. W. McCOLLOUGH ET AL  1,881,820
HOG FEEDER
Filed May 18, 1931
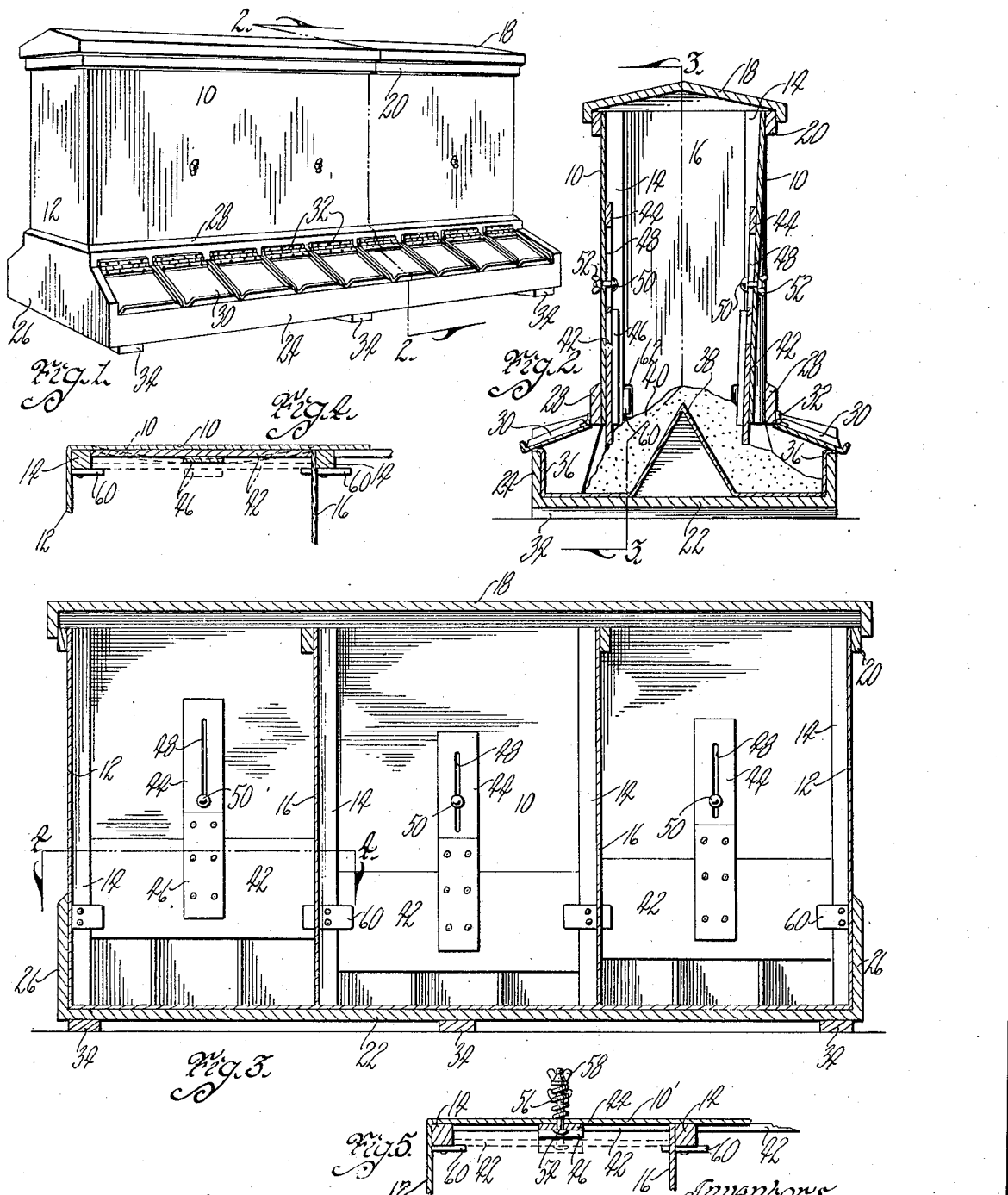

Patented Oct. 11, 1932

1,881,820

UNITED STATES PATENT OFFICE

GEORGE WILLIAM McCOLLOUGH AND McKINLEY McCOLLOUGH, OF WEBSTER CITY, IOWA

HOG FEEDER

Application filed May 18, 1931. Serial No. 538,034.

The object of this invention is to provide an improvement in hog feeders relating particularly to that type of feeder in which a hopper is provided with openings at its bottom and gates are adjustably mounted on the hopper walls for regulating the size of said openings and consequently the delivery of feed from the hopper to the feeding spaces.

More particularly, it is our object to provide a feed hopper having gates mounted on the hopper walls for vertical adjustment and being yieldably supported so as to furnish agitating means for causing feed in the hopper to be discharged to the feeding spaces.

With these and other objects in view our invention consists in the construction, arrangement and combination of the various parts of our device, whereby the objects contemplated are attained, as hereinafter more fully set forth, pointed out in the claims, and illustrated in the accompanying drawing, in which:—

Figure 1 is a perspective view of a feeder embodying our invention.

Figure 2 is a cross section on the line 2—2 of Figure 1.

Figure 3 is a longitudinal section on the lines 3—3 of Figure 2, illustrating a construction wherein the hopper is formed with three separate compartments, each provided with a sliding gate, the gates of the three compartments being adjusted to different vertical positions.

Figure 4 is a detail horizontal section on the line 4—4 of Figure 3, illustrating by dotted lines the position assumed by some of the parts for constituting an agitating means when pressure is applied to the lower end of one of the gates.

Figure 5 is a similar view illustrating a modified form with respect to the means for resiliently mounting an adjustable gate.

This feeder is of the type employing a hopper adapted to contain small grain or ground feed and to deliver it to trough portions or feed openings where animals may have access thereto.

The hopper is composed of side walls 10 and end walls 12 formed of any suitable material. In some instances it may be desirable to form the walls of sheet metal. The structure may include vertical frame members or posts 14 arranged within the hopper, to which frame members the side and end walls are secured.

The hopper may be divided into a plurality of compartments by means of transverse partitions 16 parallel with the end walls and attached to certain of the frame members 14. This arrangement may be employed for the purpose of providing separate compartments for different kinds of feed.

The hopper is open at its top and is normally closed by a cover member 18 which preferably is flanged and engages horizontal frame members 20 at the top of the hopper walls.

The hopper surmounts a trough or feeding structure composed of a bottom wall 22, low side walls 24 and higher end walls 26 to which the end walls of the hopper are attached. The end walls 26 are of less width at the upper than at their lower ends and the top portions of the two end walls are connected at each side of the hopper by a rail 28 to which the lower margins of the hopper side walls 10 may be secured.

The trough or feeding structure is of considerably greater width than the hopper and projects therebeyond, preferably at both sides, to provide feeding spaces between the side walls of the hopper and the low side walls 24 of the feeding structure. The feeding spaces may be covered by a series of doors 30, preferably formed of sheet metal, connected at their upper margins by means of hinges 32 to the rails 28 and resting at their outer margins on the top of the walls 24. The major portions of the trough or feeding structure may be and preferably are composed of wood and a plurality of cleats 34 preferably are arranged transversely on the lower surface of the bottom wall 22 in order to support the structure in slightly spaced relation to the ground.

The interior of the trough or feeding structure may be provided with a sheet metal lining 36 covering the inner faces of the walls 24 and 26. The lining member 36 also covers the bottom 22 and is bent and shaped in its central portion to provide an inverted V-shaped deflector portion 38. The walls of the deflector portion 38 preferably are quite steep and high, extending upwardly to a point above the lower margins of the hopper side walls 10 and equally spaced therefrom. It is the function of the deflector portion 38 to cause granular feed such as 40 contained in the hopper, to be deflected outwardly toward the feeding spaces so that it will be available to the animals.

The structure thus far described is quite common and well known. In such feeders, however, it has been found that there is a tendency for the feed to clog in the hopper so that it will not feed down to the feeding spaces. This is peculiarly true when the hopper is employed for ground feed or feed which is moist and therefore liable to pack. Our present invention is designed particularly to overcome this trouble.

Mounted against the inner faces of the side walls 10 of the hopper are gates 42 which preferably are vertically adjustable and are employed for partially covering and adjusting the space between the lower margins of the hopper side walls and the bottom of the trough or feeding structure. As here shown, there is one of the gates 42 for each of the compartments defined by the end walls 12 and partitions 16 or rather one gate on each side of each of said compartments in the event the feeding spaces are arranged on both sides of the hopper.

The gates 42 preferably are composed of wooden boards fitted for vertical sliding movement between a pair of vertical frame members 14 or between one of said frame members and a partition at the opposite side of the compartment.

Each sliding gate 42 has secured thereto an attaching strip 44 which is of less width and centrally located on the gate. As here shown, the attaching strip 44 is also of wood and in the same vertical plane as the gate 42, being attached thereto by a cleat 46 fixed to the inner faces of said members.

The attaching strip 44 in each instance is formed with a vertically arranged slot 48 and a bolt 50 is extended through said slot and through the wall 10 of the hopper with which said strip contacts. The outer end portion of the bolt 50 is threaded and preferably provided with a wing nut 52. By loosening the wing nut 52, either of the gates 42 may be manually adjusted to the desired elevation to provide a suitable feeding space between its lower margin and the bottom of the trough or feeding structure, whereby to permit passage of the grain. For different feeds it may be desirable to adjust the gates to different elevations as illustrated in Figure 3.

The gates 42, according to our invention, are designed to serve an additional purpose, namely that of agitating means for preventing clogging of the feed in the hopper and causing it to travel toward the feeding spaces. This function is accomplished by yieldingly mounting the gates for inward movement toward the center of the hopper and away from the planes normally occupied by the gates.

In the event sheet metal is employed for the side walls 10 of the hopper, this resilient mounting is secured through the resilient character of the side walls. In other words, the material of the side walls 10 is capable of yielding, bending or giving inwardly to such an extent to permit the gates 24 to travel out of their normal positions as indicated by dotted lines in Figure 4.

It will be understood that when the animals are seeking feed through any of the feed openings their snouts or other portions of their heads are apt to come into contact with the lower portions of the gates 42 which project below the lower margins of the side walls 10 and below the rails 28. This contact is often forcible and it is sufficient to move the gates inwardly away from their normal positions as permitted by the yielding mounting just spoken of. Thus, the yieldingly mounted gates 42 may function as agitating means for displacing any of the grain such as 40 which may tend to clog in the lower part of the hopper and between the bottom of the hopper walls and the steep walls of the deflector portion 38.

The use of the narrow attaching strips 44 for the mounting of the gates has merit in that it takes advantage of the greater flexibility in the central part of the section of the sheet metal wall 10 on which it is mounted and at the same time, by extending a material distance vertically in contact with said wall, serves to distribute the strain so that the stress is not concentrated at the point where the wall is engaged by the bolt 50. This arrangement permits considerable movement at the lower edge of the gate 42, under stress of pressure by an animal seeking food, without causing any damage to the wall on which the gate is mounted.

In Figure 5 we have shown a different method of mounting the gates. In this arrangement of the parts the bolts 54 are of greater length and each is capable of accommodating a coil spring 56, which coil spring furnishes the means for resilient mounting of the attaching strips 44 of the gates. The springs 56 may be located either outside of the hopper walls as shown or within the hopper walls and in either event a tightening of the wing nuts 58 serves not only to hold the gates in the desired positions of adjustment but also to place the springs under tension. The springs 56 according to this construction provide means for resiliently mounting the gates and therefore the hopper walls 10' may be constructed of rigid material such as wood.

Inasmuch as the attaching bolts 50 or 54 are located a considerable distance above the lower margins of the gates 42, it will be understood that the lower portions of the gates are capable of considerable inward movement under strain for agitating purposes.

It is desirable to provide some means for limiting the inward movement of the gates and for such purposes we have shown stop strips 60 attached to the inner faces of the frame members or posts 14 and projecting across the inner ends of the gates in positions spaced from the normal positions of said gates on account of the greater thickness of said frame members. Some of the stop strips 60 may extend in both directions from the posts 14 and through slotted openings 62 in the partition walls 16 in order to furnish stop means for gates located in adjacent compartments.

According to either form of our invention there is provided a simple and yet very effective agitating means to prevent clogging of feed in the hopper and also to insure that the feed will properly travel to and be accessible at the feeding spaces.

We claim as our invention:—

1. In a hog feeder having a hopper formed with a feed opening, a gate arranged in a plane parallel with and at the inner side of a wall of the hopper for partially covering said feed opening, an attaching strip of less width than the gate and extending upwardly therefrom a material distance in contact with the central portion of said wall, means for securing said strip to the hopper wall, the means for mounting said strip permitting its lower end to move inwardly away from the plane of the hopper wall, and such movement being amplified toward the lower portion of said gate, whereby the gate may yield materially due to thrust on its outer face, for constituting an agitating means to prevent clogging of feed in the hopper.

2. In a hog feeder having a hopper formed with a feed opening, a gate arranged in a plane parallel with and at the inner side of a wall of the hopper for partially covering said feed opening, an attaching strip of less width than the gate and extending upwardly therefrom a material distance in contact with the central portion of said wall, said strip being formed with a longitudinal slot, a bolt extending through said slot and the adjacent hopper wall, the means for mounting said strip permitting its lower end to move inwardly away from the plane of the hopper wall, and such movement being amplified toward the lower portion of said gate, whereby the gate may yield materially due to thrust on its outer face, for constituting an agitating means to prevent clogging of feed in the hopper.

3. In a hog feeder having a hopper wall formed with a feed opening at its lower part, a gate arranged in contact with the inner face of said wall and arranged to partially cover said feed opening, said gate having an attaching portion at its top and spaced materially above the feed opening, a bolt extending through said attaching portion and the hopper wall, and a spring on said bolt permitting an inward movement of the gate under thrust to agitate and facilitate passage of feed to said opening.

4. In a hog feeder having a hopper wall formed of sheet metal and with a feed opening at its lower part, a gate arranged in contact with said wall and designed to partially cover said feed opening, and means for attaching said gate to said wall at a point spaced above the upper margin of said feed opening, the inherent resilience of said sheet metal wall permitting it to flex under force applied to the lower portion of said gate, thereby permitting a rocking movement of the gate to constitute an agitating means.

5. In a hog feeder having a hopper wall formed of material having some inherent flexibility and formed with a feed opening at its lower part, a gate arranged to partially cover said feed opening, said gate being provided with a relatively narrow attaching strip extending upwardly therefrom a material distance in contact with the central portion of said hopper wall, and a bolt for securing said attaching strip to the hopper wall at a point spaced materially above the upper edge of said feed opening, the flexible nature of said hopper wall permitting the attaching strip and gate to move inwardly away from the plane of the hopper wall, whereby the gate may yield materially because of thrust on its outer face, for constituting an agitating means to prevent clogging of feed in the hopper.

GEORGE WILLIAM McCOLLOUGH.
McKINLEY McCOLLOUGH.